(12) United States Patent
Chow et al.

(10) Patent No.: US 12,276,563 B2
(45) Date of Patent: Apr. 15, 2025

(54) DEVICE, SYSTEM AND METHOD FOR LOAD DETECTION

(71) Applicant: Logistics and Supply Chain MultiTech R&D Centre Limited, Pok Fu Lam (HK)

(72) Inventors: Wing Leung Chow, Pok Fu Lam (HK); Lu Sze Wai, Pok Fu Lam (HK); Yuan Li Yin, Pok Fu Lam (HK); Kwai Yuen Tiu, Pok Fu Lam (HK)

(73) Assignee: Logistics and Supply Chain MultiTech R&D Centre Limited, Pok Fu Lam (HK)

( * ) Notice: Subject to any disclaimer, the term of this patent is extended or adjusted under 35 U.S.C. 154(b) by 347 days.

(21) Appl. No.: 17/692,592

(22) Filed: Mar. 11, 2022

(65) Prior Publication Data

US 2023/0288283 A1 Sep. 14, 2023

(51) Int. Cl.
*G01M 1/12* (2006.01)
*G01G 21/22* (2006.01)

(52) U.S. Cl.
CPC ............ *G01M 1/122* (2013.01); *G01G 21/22* (2013.01)

(58) Field of Classification Search
None
See application file for complete search history.

(56) References Cited

U.S. PATENT DOCUMENTS

2020/0283279 A1* 9/2020 Chow ...................... B66F 9/22

FOREIGN PATENT DOCUMENTS

| CN | 109363450 A | * | 2/2019 | ............. A47F 11/00 |
| CN | 213364006 U | * | 6/2021 | |
| CN | 215591306 U | * | 1/2022 | ............. B65D 19/38 |
| DE | 10021491 A | * | 11/2001 | ............. G01G 3/12 |
| WO | WO-2019/238706 A | * | 12/2019 | ........... G08B 21/245 |
| WO | WO 2020223961 A | * | 11/2020 | ............. G01G 23/18 |

* cited by examiner

*Primary Examiner* — Daniel S Larkin
(74) *Attorney, Agent, or Firm* — Renner, Kenner, Greive, Bobak, Taylor & Weber

(57) ABSTRACT

There is provided a load detection device for use in a warehouse. The load detection device includes one or more load modules (100) configured to support a load (200) and obtain a data of the load (200). Each of the one or more load modules (100) includes an electronic load cell (101) for converting weight or force applied on the electronic load cell (101) by the load (200) into an electrical signal to provide raw weight data of the load, a mounting base (102) coupled to the electronic load cell (101) for supporting the electronic load cell (101) to be placed against a ground, and a platform (103) coupled to an upper part of the electronic load cell (101) to increase an area of contact with the load (101).

19 Claims, 5 Drawing Sheets

DEVICE, SYSTEM AND METHOD FOR LOAD DETECTION

TECHNICAL FIELD

The present invention relates to a device, a system and a method for load detection. In particular, the present invention relates to a device and a system for load detection for use in a warehouse, and a relevant method using the system.

BACKGROUND OF THE INVENTION

Warehousing is becoming increasingly popular, especially with increasing popularity of online shopping and delivery of goods/products. Warehouses are an example of an indoor environment where automated guided vehicles (AGVs) are commonly used. For the convenience of management and security of the warehouse where the AGVs are used, there is a need to ensure the stability of shelving racks or goods transported by the AGVs. In practical applications, due to the different positions of goods placed on the shelf/racks or error offset caused by movement of the AGVs, e.g. acceleration, deceleration or turn (for example, rotation) of the AGVs, a location of a center of gravity (CG) of the shelf/racks can be shifted. This can cause capsizing of the shelf during the movement after being lifted by the AGVs.

In light of the foregoing, there has been a need to provide an improved load detection system for an operator to detect any unsafe situation regarding the load in the warehouse where the AGVs are used.

SUMMARY OF THE INVENTION

According to an aspect of the present invention, there is provided a load detection device for use in a warehouse. The load detection device includes one or more load modules configured to support a load and obtain a data of the load. Each of the one or more load modules includes an electronic load cell for converting weight or force applied on the electronic load cell by the load into an electrical signal to provide raw weight data of the load, a mounting base coupled to the electronic load cell for supporting the electronic load cell to be placed against a ground, and a platform coupled to an upper part of the electronic load cell to increase an area of contact with the load.

In some embodiments, the electronic load cell may include a cylindrical sensor.

In some embodiments, the mounting base may include two mounting members that are connected to each other while surrounding the electronic load cell.

In some embodiments, the mounting base may be made of a rigid material.

In some embodiments, the rigid material may include a metal, such as aluminium or stainless steel.

In some embodiments, the platform may be coupled to the upper part of the load cell by fasteners.

According to another aspect of the present invention, there is provided a load detection system including the aforesaid load detection device and a weighing acquisition module for receiving the raw weight data of the load from the load detection device.

In some embodiments, the weighing acquisition module may be connected to the one or more load modules by an underground cable.

In some embodiments, the weighing acquisition module may be placed in or on the load.

In some embodiments, the weighing acquisition module may include a junction box connected to the one or more load modules.

In some embodiments, the weighing acquisition module may be configured to conduct at least one of zero drift correction and digital filtering.

In some embodiments, the load detection system may further include a server which receives data of the load from the weighing acquisition module for further processing.

In some embodiments, the server may be configured to simulate a location of a center of gravity (CG) of the load based on the data of the load from the weighing acquisition module.

In some embodiments, the server may receive the data of the load from the weighing acquisition module using a standard for use in serial communication systems.

In some embodiments, the load detection system may include an automated guided vehicle (AGV) for transporting the load.

In some embodiments, the load detection system may include the load which comprises a shelf or a box to store goods or products.

According to another aspect of the present invention, there is provided a method for load detection for use in a warehouse. The method includes providing the aforesaid load detection system (step A), operating an automated guided vehicle (AGV) to transport a load to a desired place in the warehouse (step B), placing the load on the one or more load modules arranged in the desired place (step C), receiving, by the weighing acquisition module, the raw weight data of the load from the one or more load modules and transmitting, by the weighing acquisition module, the data of the load to the server (step D), receiving, by the server, the data of the load (step E), obtaining a location of a center of gravity (CG) based on the data of the load (step F), and determining if the load is an unsafe situation based on the location of the center of gravity (CG) (step G).

In some embodiments, step D may further include performing at least one of zero drift correction and digital filtering before transmitting the data of the load to the server.

In some embodiments, step G may include determining that the load is in an unsafe situation if the location of the center of gravity (CG) is out of a predetermined range, or determining that the load is not in an unsafe situation if the location of the center of gravity (CG) is within the predetermined range.

In some embodiments, step E may include receiving the data of the load using a standard for use in serial communication systems.

Other features and aspects of the invention will become apparent by consideration of the following detailed description, drawings and claims.

Before any independent constructions of the invention are explained in detail, it is to be understood that the invention is not limited in its application to the details of construction and the arrangement of components set forth in the following description or illustrated in the following drawings. The invention is capable of other independent constructions and of being practiced or of being carried out in various ways. Also, it is to be understood that the phraseology and terminology used herein is for the purpose of description and should not be regarded as limiting.

Use of "including" and "comprising" and variations thereof as used herein is meant to encompass the items listed thereafter and equivalents thereof as well as additional items. Use of "consisting of" and variations thereof as used herein is meant to encompass only the items listed thereafter and equivalents thereof.

BRIEF DESCRIPTION OF DRAWINGS

These and other features of the invention will become more apparent from the following description, by way of example only, with reference to the accompanying drawings, in which.

Before any embodiments of the invention are explained in detail, it is to be understood that the invention is not limited in its application to the details of embodiment and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting.

DETAILED DESCRIPTION OF PREFERRED EMBODIMENTS

Hereinafter, embodiments of the present disclosure will be described in detail with reference to the drawings.

Figure 1:
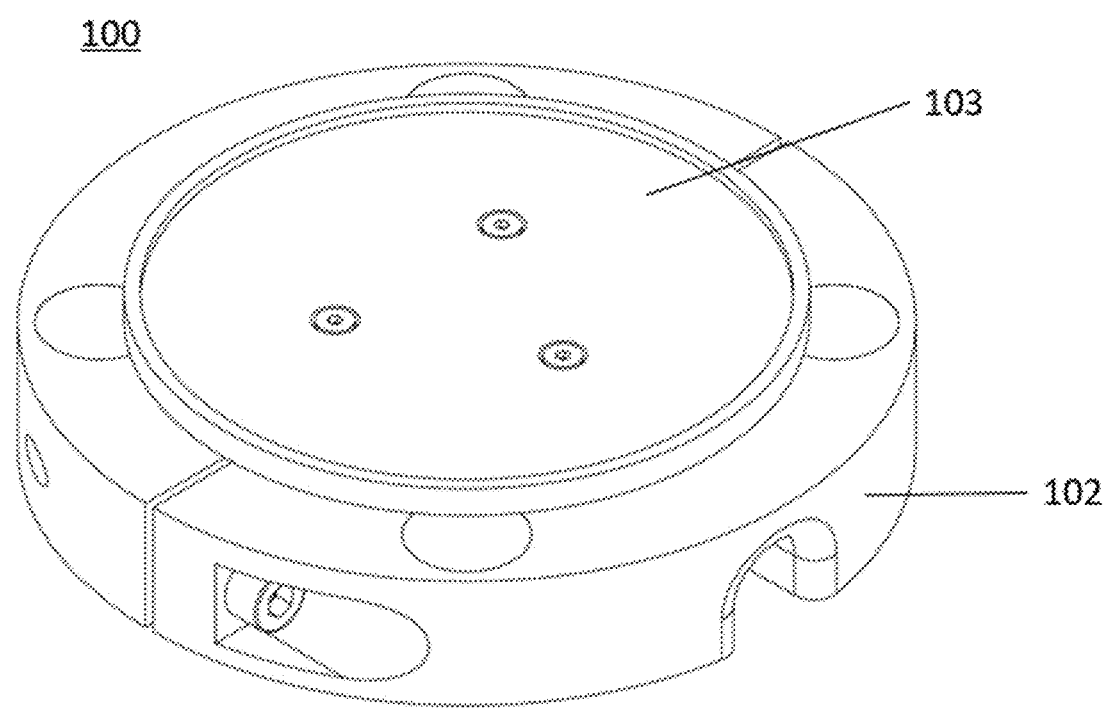
FIG. 1 is a perspective view of a load detection device according to an embodiment of the present invention.
Figure 2:
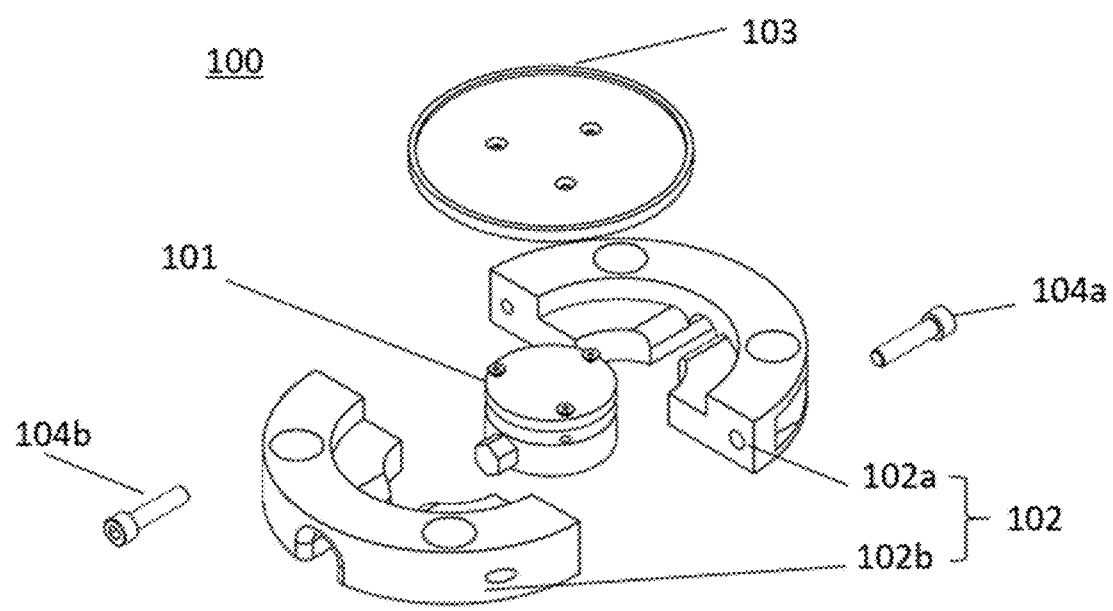
FIG. 2 is a perspective view of a load detection device of FIG. 1, showing that an electrical load cell, a mounting base and a supporting platform are decomposed.

A load detection device can be used in an intelligent warehouse environment where an automated guided vehicle (AGV) is used for transporting a load, in order for management and security of operating the AGV in the warehouse. The load detection device can help ensure the stability of the load (for example, a shelf, shelving racks, boxes, goods or products) during transit by the AGV. According to an embodiment of the present invention, a load detection device includes one or more load modules 100. The one or more load modules 100 are configured to support a load and obtain data of the load. FIG. 1 shows an example load module 100 including an electronic load cell (101, not shown in FIG. 1 but shown in FIG. 2), a mounting base (102) and a platform (103) that are in a combined state. FIG. 2 illustrates the load module 100 in FIG. 1 in a decomposed state to show how the electronic load cell (101), the mounting base (102) and the platform (103) are connected.

With reference to FIG. 1 and FIG. 2, the load module 100 includes the electronic load cell 101 for converting weight or force applied on the electronic load cell 101 by the load into an electrical signal to provide raw weight data of the load, the mounting base 102 coupled to the electronic load cell 101 for supporting the electronic load cell 101 to be placed against a ground, and the platform 103 coupled to an upper part of the electronic load cell 101 to increase an area of contact with the load. For example, the load may be a cabinet, a shelf, shelving racks, boxes, goods and/or products. The cabinet, shelf, shelving racks or boxes may store goods or products. Each one of corners or parts of the load, or each one of legs or foots of the load can be put on each of the load modules 100. If the bottom of the load is a square or a rectangular shape and has four corners (or four foots), four load modules 100 can be respectively provided under the four corners of the load to support and detect the load. If the load is placed on the one or more load modules 100, each electronic load cell 101 detects weight or force applied thereon by the load and converts it into an electrical signal to provide raw weight data. The electronic load cell 101 may include a cylindrical metal sensor.

As shown in FIG. 2, the mounting base 102 may include two mounting members 102a, 102b that are connected to each other while surrounding the electronic load cell 101. The mounting members 102a, 102b can be connected by fasteners 104a, 104b. A skilled person in the art would understand that the number of the mounting members and the connection scheme for the mounting members is not limited to what is provided here. The mounting base 102 provides more stable support for the electronic load cell 101 to be placed against the ground. The mounting base 102 may be made of a rigid material. The rigid material may include a metal, preferably aluminium or stainless steel. The platform 103 is provided to be coupled to an upper part of the electronic load cell 101 to increase the area of contact with the load, for example, the shelf's foot or leg, so that stability of landing of the shelf by the AGV is improved. The platform 103 can be closely coupled to the upper part of the electronic load cell 101 by fasteners. The platform 103 may be made of stainless steel.

Figure 3:
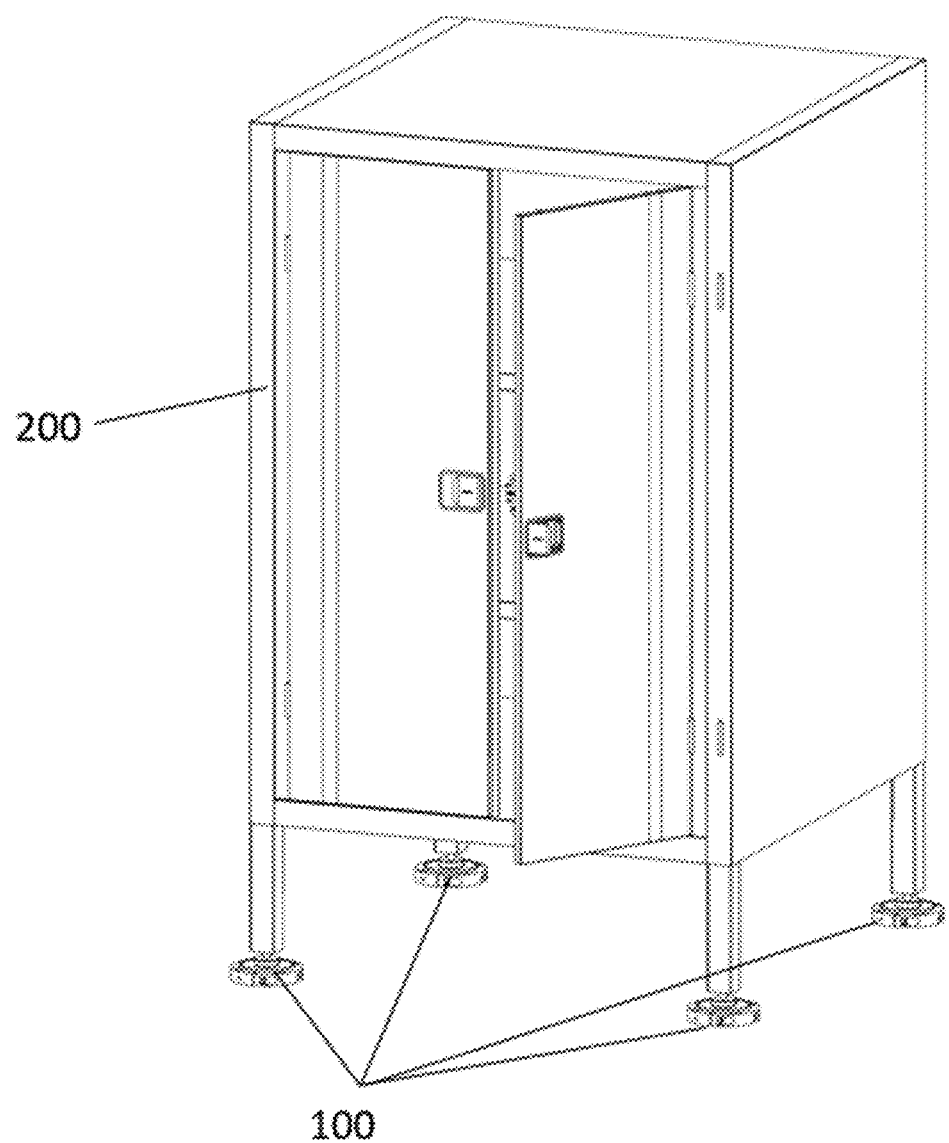
FIG. 3 is a perspective view of an example arrangement of one or more modules and a load according to an embodiment of the present invention.

FIG. 3 shows an example arrangement between the one or more modules 100 and a load 200. For example, the load 200 can be a cabinet having shelving racks to store goods and four legs to support a cuboid cabinet body from the corners against the ground. As shown in FIG. 3, the four legs are placed on the four load modules 100, respectively. The cabinet 200 can be transported by the AGV to a desired place in the warehouse. The load modules 100 are arranged in the desired place so that the cabinet 200 can be placed by the AGV onto the load modules 100.

A weighing acquisition module 104 (see FIG. 4) is arranged in or on the load 200. For example, the weighing acquisition module 104 can be arranged in the cabinet 200. The weighing acquisition module 104 can be connected to the one or more load modules 100 by an underground cable. The underground cable may include one or more (e.g. four) shielded wires (or cables) that are connected to and come with the one or more load modules 100, respectively. The weighing acquisition module 104 is configured to receive the raw weight data of the load 200 from the one or more load modules 100. The weighing acquisition module 104 may be a junction box connected to the one or more load modules 100 (in particular, the electronic load cells) by the underground cable. For example, the junction box includes four channels, each of which is connected to each of the four load modules 100. Each of the four channels delivers the weight data/information from each of the load modules 100 to the weighing acquisition module 104, and the weighing acquisition module 104 processes the weight data/information. The weighing acquisition module 104 can process the raw weight data, for example, zero drift correction, digital filtering, or both. The junction box may be a printed circuit board (PCB) housed in a robust enclosure. The enclosure may be made of strong materials, such as polycarbonate. The enclosure may have entries for cables connected to the electronic load cells of the load modules 100.

Figure 4:
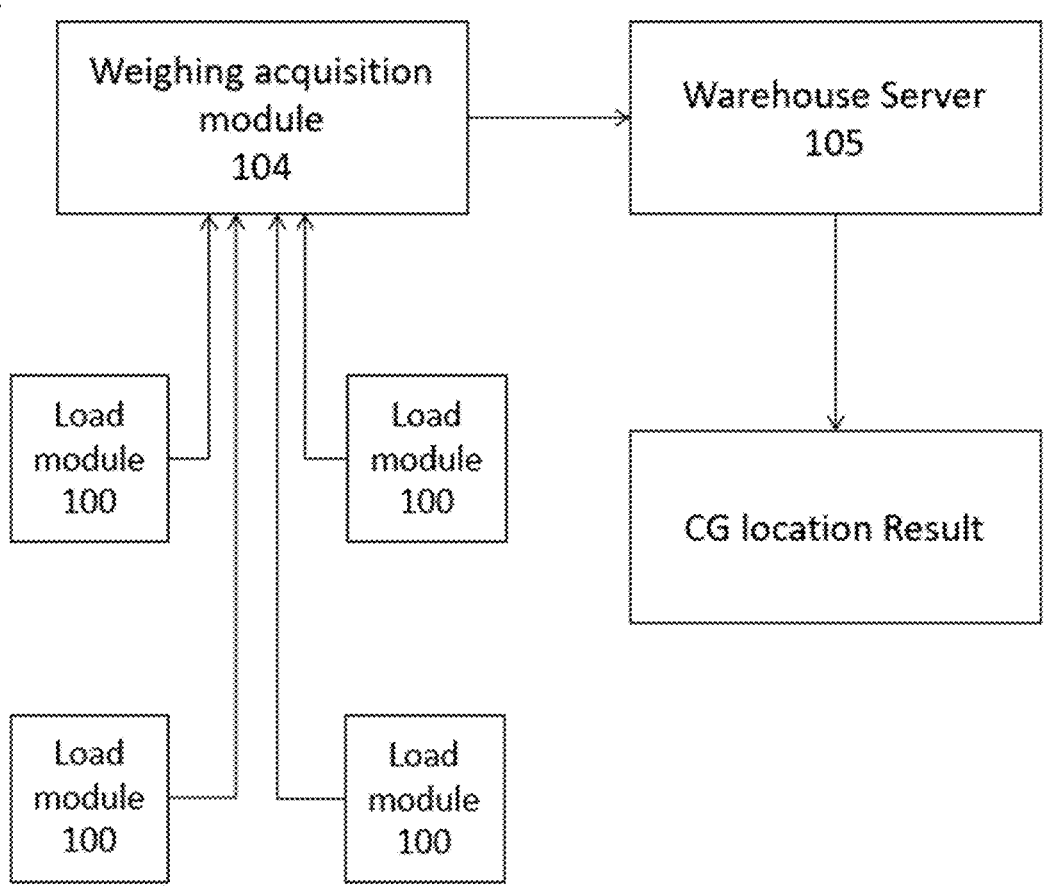
FIG. 4 is a schematic diagram of a load detection system according to an embodiment of the present invention.

A server 105 is provided to receive the data of the load from the weighing acquisition module 104 for further processing. With reference to FIG. 4, which shows a schematic diagram of a load detection system 300 including the one or more load modules 100, the weighing acquisition module 104 and the server 105, the server 105 receives the data of the load 200 from the weighing acquisition module 104 and conducts further processing on the data of the load 200. For example, the server 105 is configured to simulate a location of a center of gravity (CG) of the load 200 based on the data of the load to provide more intuitive understanding of the current load safety situation. That is, the simulation result could provide information regarding the possibility of capsizing during the transit by the AGV or overweight of the load.

The server 105 may receive the data of the load 200 from the weighing acquisition module 104 using a standard for use in serial communication systems. For example, RS-485 can be used for communication in real time.

Figure 5:
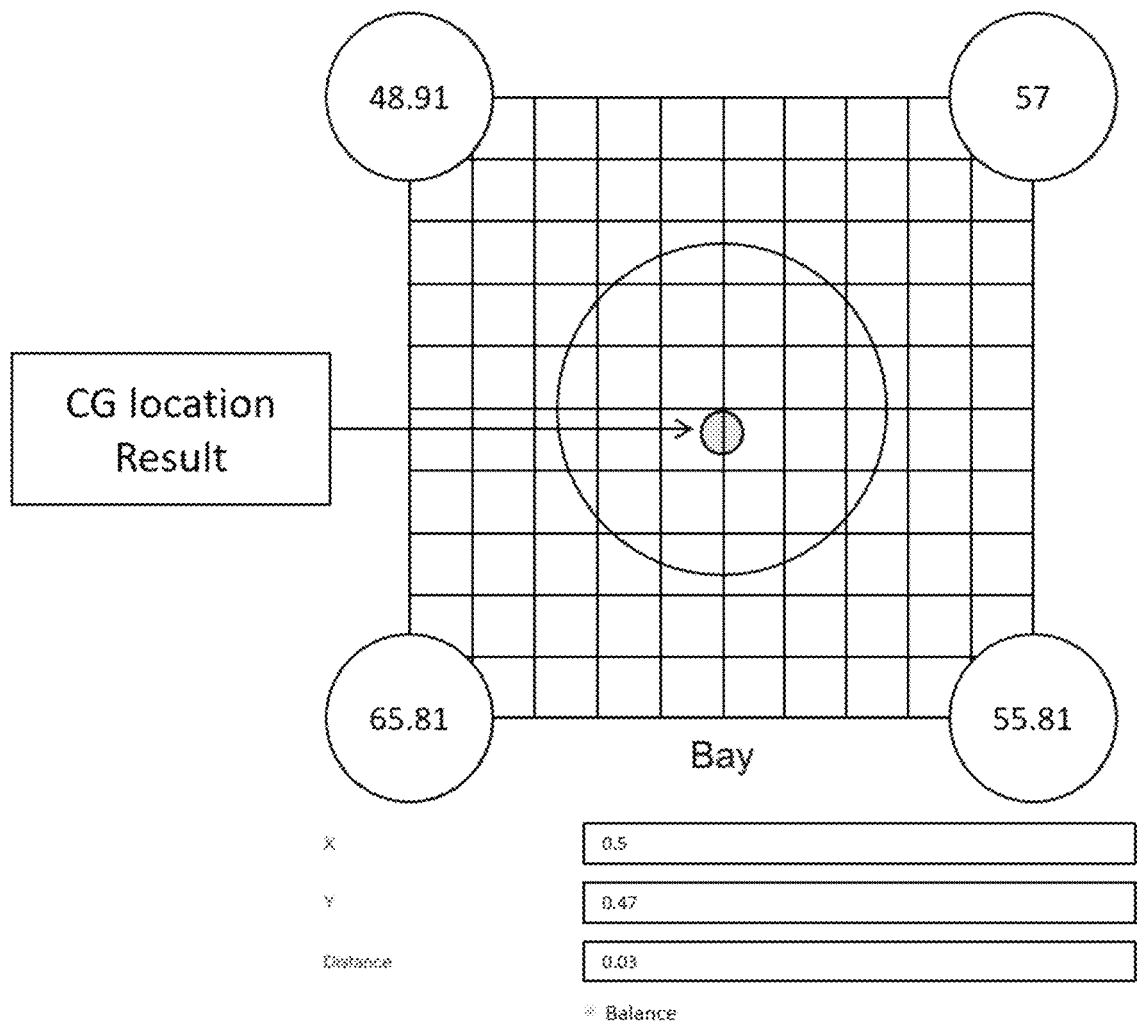
FIG. 5 is an example interface of a server part showing a location of a center of gravity (CG) of a load according to an embodiment of the present invention.

FIG. 5 shows an example interface of the server 105 part showing the location of the center of gravity (CG) of the load 200. The numeral values at four corners, 48.91, 57, 65.81 and 55.81 are the weight data of the load corresponding to the four corners (i.e., four legs or foots of the cabinet 200) received from the weight acquisition module 104. The server 105 can calculate the location of the CG of the load based on the four numeral values. The location of the CG of the load can be provided as x-y coordinates as shown in FIG. 5. The simulation result of the location of the CG of the load can be compared to a predetermined range to determine if the load is in an unsafe situation (i.e., possibility of capsizing). The predetermined range may be determined by a user, and adjusted according to the level of safety desired.

According to another aspect of the invention, there is provided a method for load detection for use in a warehouse by using the load detection system described as above with reference to FIGS. 3 and 4. The provision of the load detection system (step A) may be considered as part of the method. In operation, the one or more load modules 100 are arranged in a desired place in the warehouse.

According to the method, an operator operates the automated guided vehicle (AGV) to transport the load to a desired place in the warehouse (step B). The warehouse environment may have a plurality of load modules 100 arranged in certain places in the warehouse. A certain number of load modules 100 can be grouped to correspond to one load. For example, four load modules 100 can be placed in a certain place of the warehouse on four corners of a 120 cm×120 cm square on the ground in order to fit a load having a bottom of a 120 cm×120 cm square shape. The four load modules 100 can be arranged to correspond to the four foots of the load. The arrangement of the load modules 100 may depend on the warehouse environment in consideration of the area of the warehouse, the size of the load, the number of the certain places in the warehouse, etc.

The AGV may be a vehicle having a flat top part which can support or lift the load. For example, when the load (i.e., a shelf/cabinet) has four legs of a certain height, the AGV with a shorter height can move under the load between the legs and lift the load to move the load to a desired place. It would be understood that the AGV may transport the load in different ways, such as using a push/pull scheme, using robot arms or any other ways as long as the AGV is operated to transport the load.

The load is placed on the one or more load modules 100 arranged in the desired place (step C). That is, the AGV can set the load to the desired place while corresponding the four corners of the load to the arranged four load modules 100 in the desired place.

Each of the load modules 100 detects force/weight applied by the load and obtains raw weight data. The load modules 100 send the raw weight data to the weighing acquisition module 104. The weighing acquisition module 104 receives the raw weight data of the load and conducts some processing on the raw weight data if needed (step D). For example, at least one of zero drift correction and digital filtering may be performed. After the processing, the weighing acquisition module 104 transmits the processed data of the load to the server 105.

The server 105 receives the data of the load from the weight acquisition module 104 (step E). The server 105 obtains a location of a center of gravity (CG) based on the received data of the load (step F). That is, the server 105 performs simulation of obtaining the location of the CG. The simulation result of the location of the CG of the load can be compared to a predetermined range to determine if the load is in an unsafe situation (i.e., possibility of capsizing) (step G). If the location of the CG is out of the predetermined range, it is determined that the load is in an unsafe situation. If the location of the CG is within the predetermined range, it is determined that the load is not in the unsafe situation. The data of the load can be received by the server using a standard for use in serial communication systems, for example, RS-485.

It should be understood that the above only illustrates and describes examples whereby the present invention may be carried out, and that modifications and/or alterations may be made thereto without departing from the spirit of the invention.

It should also be understood that certain features of the invention, which are, for clarity, described in the context of separate embodiments, may also be provided in combination in a single embodiment. Conversely, various features of the invention which are, for brevity, described in the context of a single embodiment, may also be provided or separately or in any suitable sub-combination.

The invention claimed is:

1. A load detection system configured for use in a warehouse, comprising a load detection device including:
   one or more load modules configured to support a load and obtain a data of the load, wherein each of the one or more load modules comprises:
   an electronic load cell configured for converting weight or force applied on the electronic load cell by the load into an electrical signal to provide raw weight data of the load;
   a mounting base coupled to the electronic load cell configured for supporting the electronic load cell to be placed against a ground, wherein the mounting base comprises two mounting members that are connected to each other while surrounding the electronic load cell; and
   a platform coupled to an upper part of the electronic load cell to increase an area of contact with the load.

2. The load detection system of claim 1, wherein the electronic load cell comprises a cylindrical sensor.

3. The load detection system of claim 1, wherein the mounting base is made of a material which comprises a metal.

4. The load detection system of claim 3, wherein the metal is aluminium or stainless steel.

5. The load detection system of claim 1, wherein the platform is coupled to the upper part of the load cell by fasteners.

6. The load detection system of claim 1, further comprising:
   a weighing acquisition module for receiving the raw weight data of the load from the load detection device.

7. The load detection system of claim 6, wherein the weighing acquisition module is connected to the one or more load modules by an underground cable.

8. The load detection system of claim 6, wherein the weighing acquisition module is placed in or on the load.

9. The load detection system of claim 6, wherein the weighing acquisition module comprises a junction box connected to the one or more load modules.

10. The load detection system of claim 6, wherein the weighing acquisition module is configured to conduct at least one of zero drift correction and digital filtering.

11. The load detection system of claim 6, further comprising a server which receives data of the load from the weighing acquisition module for further processing.

12. The load detection system of claim 11, wherein the server is configured to simulate a location of a center of gravity (CG) of the load based on the data of the load from the weighing acquisition module.

13. The load detection system of claim 11, wherein the server receives the data of the load from the weighing acquisition module using a standard for use in serial communication systems.

14. The load detection system of claim 6, including an automated guided vehicle (AGV) for transporting the load.

15. The load detection system of claim 6, including the load which comprises a shelf or a box to store goods or products.

16. A method for load detection for use in a warehouse, comprising the following steps:
   A. providing a load detection system as in claim 6;
   B. operating an automated guided vehicle (AGV) to transport a load to a desired place in the warehouse;
   C. placing the load on the one or more load modules arranged in the desired place;
   D. receiving, by the weighing acquisition module, the raw weight data of the load from the one or more load modules and transmitting, by the weighing acquisition module, the data of the load to the server;
   E. receiving, by the server, the data of the load;
   F. obtaining a location of a center of gravity (CG) based on the data of the load;
   G. determining if the load is an unsafe situation based on the location of the center of gravity (CG).

17. The method of claim 16, wherein step D further comprises performing at least one of zero drift correction and digital filtering before transmitting the data of the load to the server.

18. The method of claim 16, wherein step G comprises determining that the load is in an unsafe situation if the location of the center of gravity (CG) is out of a predetermined range, or determining that the load is not in an unsafe situation if the location of the center of gravity (CG) is within the predetermined range.

19. The method of claim 16, wherein step E comprises receiving the data of the load using a standard for use in serial communication systems.

\* \* \* \* \*